United States Patent
Mercier

[15] 3,648,590
[45] Mar. 14, 1972

[54] ADJUSTABLE LOUVRES FOR HEATING AND VENTILATION SYSTEMS OF VEHICLES

[72] Inventor: Jacques Mercier, Billancourt, France

[73] Assignees: Regie Nationale Des Usines Renault, Billancourt (Hauts de Seine); Automobiles Peugeot, Paris, France

[22] Filed: Jan. 29, 1970

[21] Appl. No.: 6,715

[30] Foreign Application Priority Data

Jan. 31, 1969 France..................................6902152

[52] U.S. Cl. ................................................98/2 D, 98/110
[51] Int. Cl..........................................................B60h 1/24
[58] Field of Search............... 98/2, 2.3, 2.4, 2.5, 2.6, 2CPV, 98/110, 107, 40 V; 62/262; 49/74, 77, 78, 81

[56] References Cited

UNITED STATES PATENTS

| | | | |
|---|---|---|---|
| 2,153,075 | 4/1939 | Copeland | 98/121 R |
| 3,035,421 | 5/1962 | Halbeisen | 98/40 V X |
| 3,063,357 | 11/1962 | Eberhart | 98/110 X |

*Primary Examiner*—Meyer Perlin
*Assistant Examiner*—W. C. Anderson
*Attorney*—Stevens, Davis, Miller & Mosher

[57] ABSTRACT

An improvement in ventilation and heating systems of automotive vehicles, characterized in that the dashboard louvres delivering heated or fresh air to the passenger compartment consist of a plurality of shutters pivoted about fixed pivot pins are responsive to oblique links adapted gradually to control the relative angular setting of said shutters with respect to one another thus achieving converging or diverging airflow.

3 Claims, 3 Drawing Figures

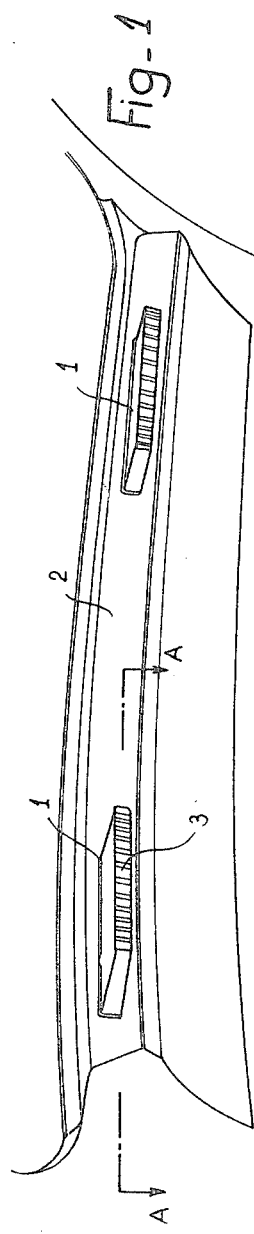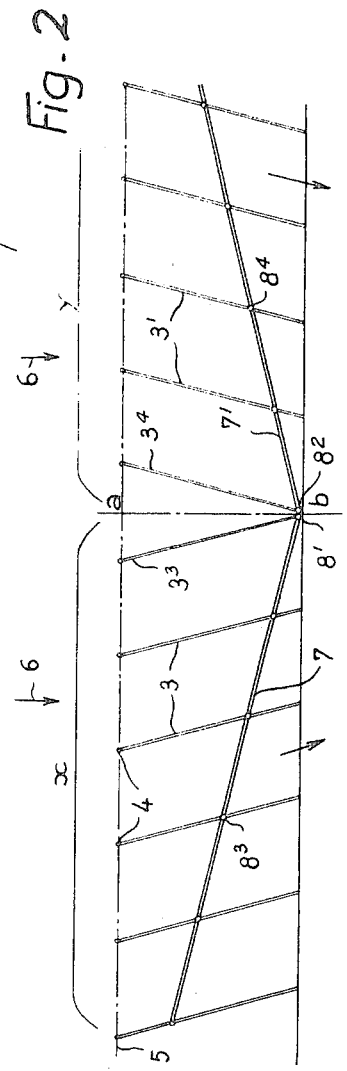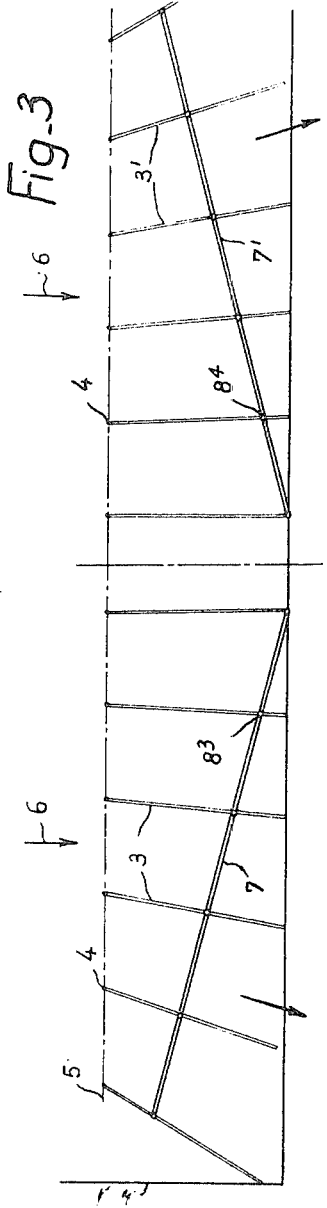

ADJUSTABLE LOUVRES FOR HEATING AND VENTILATION SYSTEMS OF VEHICLES

This invention relates in general to improvements in or relating to the heating and ventilation system of automotive vehicles, and more particularly to louvres for delivering heated or fresh air into the passenger compartment of a vehicle.

Many devices have already been proposed for ventilating and/or heating the interior of motor vehicles, such as conventional adjustable louvres dispensing a strong and concentrated air jet which may prove rather pleasant when starting the vehicle but can hardly be tolerated during relatively long periods. Diffused ventilation systems are also known which deliver a wide jet or air at low speed, thus ensuring an improved ambient comfort but without any possibility of producing a powerful flow under momentary and well-localized conditions.

It is the object of this invention to avoid the above-mentioned inconveniences by providing an adjustable heating and ventilation louvre whereby the air flow delivered therefrom can be controlled from the dual point of view of speed and directional distribution, by giving the desired convergence or divergence to the air jet issuing from the louvre.

The adjustable louvre according to this invention is characterized in that it comprises a set of shutters pivotally mounted and interconnected by transverse links controlled simultaneously so that the shutters can be set in the desired convergent or divergent position for directing the outcoming air jet according to a convergent or divergent flow.

A typical form of embodiment of the adjustable air louvre according to this invention will now be described in detail, by way of example, with reference to the accompanying drawing in which:

FIG. 1 is a front view of a dashboard of an automotive vehicle equipped with the adjustable louvre according to this invention;

FIG. 2 is a section taken on a larger scale along the line A—A of FIG. 1, with the shutters in a parallel position to provide a convergent ventilation; and FIG. 3 is another section similar to FIG. 2 but showing the shutters set in nonparallel positions to provide a divergent air stream.

Referring first to FIG. 1, the dashboard 2 of an automotive vehicle is equipped with a pair of lateral ventilation louvres 1.

Referring now to FIG. 2, it will be seen that each louvre comprises two sets $x$ and $y$ of shutters 3, $3^1$, respectively, having different orientations so as to converge towards the center line $ab$ of the air supply duct.

The sets of shutters 3, $3^1$ are pivotally mounted on fixed pivot pins 4 extending at right angles to a transverse line 5 and to the direction of flow of the incoming air stream. These sets of shutters 3, $3^1$ are controlled and interconnected by means of a pair of transverse links 7, $7^1$, respectively, which are connected by pivot pins $8^1$ and $8^2$ to the adjacent central shutters $3^3$ and $3^4$ of the two sets of shutters 3, $3^1$ disposed symmetrically in relation to said center line $ab$; the pivot pins $8^1$ and $8^2$ of control links 7, $7^1$ are disposed at the ends of shutters $3^3$ and $3^4$ which are opposed to said fixed pivot pins 4. In the form of embodiment shown in FIG. 2 the fixed pivot pins 4 are equally spaced along the straight line 5 and the pivot pins $8^3$, $8^4$ interconnecting the individual shutters and the control links 7, $7^1$ are so disposed that the shutters 3 are parallel in each set, so as to produce a convergent ventilation through the two sets of shutters. In this case the maximum air convergence is obtained and a high-speed air stream is produced at the passenger's level and on a well-defined and localized surface.

Preferably, the two sets of shutters of the adjustable louvre are controlled simultaneously, but independent adjustment may be obtained by properly controlling the links 7 and $7^1$.

FIG. 3 illustrates the same device in the divergentflow position obtained by actuating the control links 7 and $7^1$ to move the corresponding shutters to their opposite relative positions. In this case a maximum airflow divergence is obtained and the air stream is directed at relatively low speed over a large surface at the passenger's level. In this case the shutters are not parallel.

Of course, all the intermediate positions between these two end positions may be obtained, if desired.

In the general case this movement is permitted by pivoting the control links 7 and $7^1$ individually at points $8^3$ and $8^4$ of each shutter.

In the specific example described and illustrated herein the dimensions of the component elements are selected to permit the operation by means of one-piece control links.

It would not constitute a departure from the present invention to provide an adjustable ventilation louvre wherein the shutters are pivoted about fixed pivot pins disposed along a curved line 5 and/or having a position of maximum convergence in which the shutters are not parallel.

Of course, various modifications and variations may be brought to the specific form of embodiment of the present invention which is shown and described herein, without departing from the scope of the invention as set forth in the appended claims.

What is claimed as new is:

1. An air outlet control for ventilation and heating systems in automotive vehicles having a dashboard mounted outlet for delivering air to the passenger compartment, said control comprising an outlet, at least one set of louvers formed by a plurality of shutters, a like plurality of fixed pivots extending substantially along a transverse direction across said outlet, said shutters being mounted by one edge in said pivots to be substantially parallel to one another at said pivots, and link means pivotally connected to each of said shutters at a point remote from and oblique to the plane of at least two of said fixed pivots, said link means for rotating said shutters about said fixed pivots and thereby varying the angular relationship between the shutters in order to achieve convergent or divergent air flow.

2. The air outlet control according to claim 1, wherein at least two sets of louvers are provided adjacent one another in said transverse direction, said shutters forming each set of louvers being positioned parallel to one another and said sets of louvers positioned for convergent air flow causing a high-speed concentrated air stream.

3. The air outlet control according to claim 1, wherein at least two sets of louvers are provided adjacent one another in said transverse direction, said shutters forming each set of louvers being positioned for divergent air flow causing a low-speed diffused air stream.

* * * * *